J. A. LEWIS.
WATER GAGE AND THERMOSTAT.
APPLICATION FILED JULY 9, 1914.
1,168,518.
Patented Jan. 18, 1916.
2 SHEETS—SHEET 1.
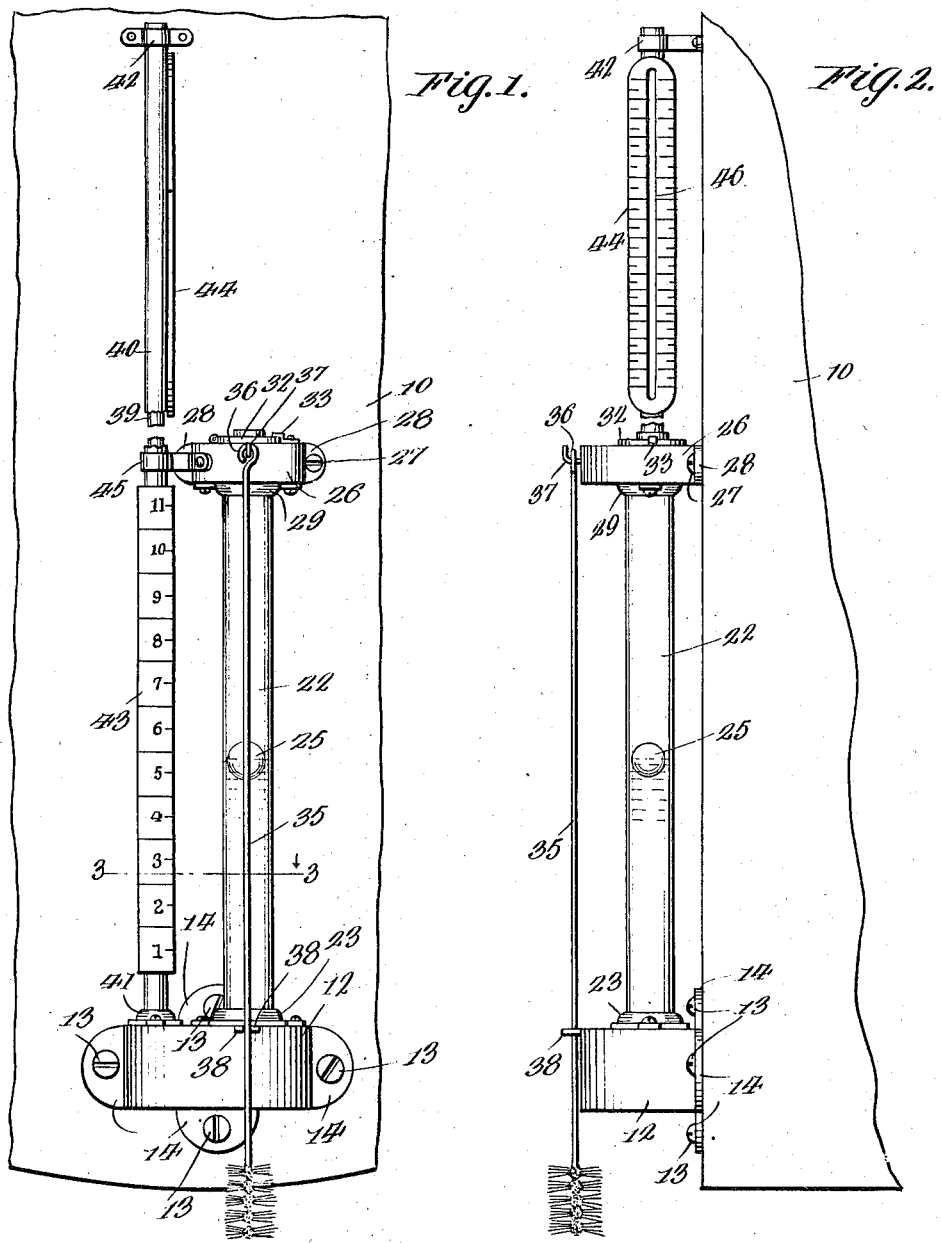
Witnesses
Inventor
James A. Lewis.
By Richard B. Owen.
Attorney

J. A. LEWIS.
WATER GAGE AND THERMOSTAT.
APPLICATION FILED JULY 9, 1914.

1,168,518.

Patented Jan. 18, 1916.
2 SHEETS—SHEET 2.

James A. Lewis, Inventor.

Witnesses
Guy M. Spring.
Ross J. Woodward.

By Richard B. Owen,
Attorney

UNITED STATES PATENT OFFICE.

JAMES A. LEWIS, OF MINNEAPOLIS, MINNESOTA.

WATER-GAGE AND THERMOSTAT.

1,168,518.  Specification of Letters Patent.  Patented Jan. 18, 1916.

Application filed July 9, 1914. Serial No. 850,000.

*To all whom it may concern:*

Be it known that I, JAMES A. LEWIS, a citizen of the United States, residing at Minneapolis, in the county of Hennepin and State of Minnesota, have invented certain new and useful Improvements in Water-Gages and Thermostats, of which the following is a specification.

This invention relates to an improved type of water gage and thermometer for use on a washing machine and the principal object of the invention is to provide a gage having an improved construction whereby the water will circulate through the inlet housing when the clothes washer is in operation and thus keep the water in the gage at an even temperature with the water inside the washer.

Another object of the invention is to provide an improved type of casing for the thermometer tube, the casing carrying a gage for the water tube and also carrying a gage for the thermometer tube which passes through the casing.

Another object of the invention is to provide improved means for holding the water tube in place and to also provide means for preventing a float positioned in the tube from passing out of the inlet housing or outlet housing into the tube of the clothes washer.

Another object of the invention is to so construct the outlet housing that its cap may be removed and a cleaner passed into the glass water tube.

This invention is illustrated in the accompanying drawings, wherein—

Figure 3:
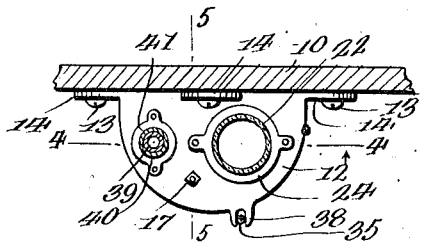
Figure 7:
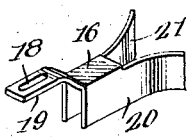
Figure 4:
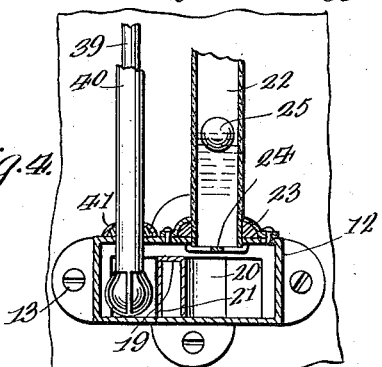
Figure 8:
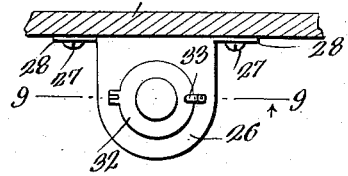
Figure 5:
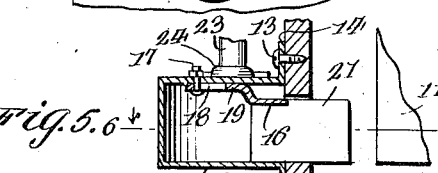
Figure 9:
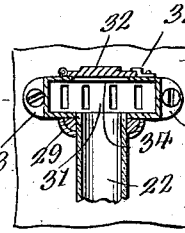
Figure 6:
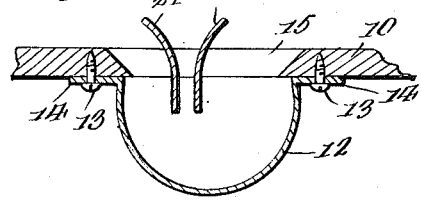
Figure 10:
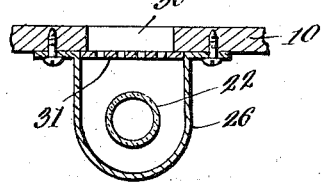

Figure 1 is a view showing the improved gage in elevation; Fig. 2 is a view similar to Fig. 1 but taken at right angles thereto; Fig. 3 is a sectional view taken along the line 3—3 of Fig. 1; Fig. 4 is a sectional view taken along the line 4—4 of Fig. 3; Fig. 5 is a sectional view taken along the line 5—5 of Fig. 3; Fig. 6 is a sectional view taken along the line 6—6 of Fig. 5; Fig. 7 is a perspective view of the device which guides the water into the inlet housing of the gage when the inner cylinder of the washer is rotated; Fig. 8 is a top plan view of the water gage; Fig. 9 is a sectional view taken along the line 9—9 of Fig. 8; Fig. 10 is a sectional view taken along the line 10—10 of Fig. 9.

In the accompanying drawings, the numeral 10 indicates the outer tub of a washer of the cylinder type. This outer tub contains an inner tub or clothes receptacle indicated by the numeral 11 in Fig. 5. This washer is of the type in which the inner tub or receptacle 11 rotates horizontally in one direction for a short time and then rotates in the opposite direction. The manner of mounting and operating the inner tub has not been shown since this washer is of a well known type and may be mounted and operated in any convenient manner. The lower or inlet housing 12 of the water gage is secured to the outer tub or water receptacle 10 by means of screws 13 which pass through the ears 14 and said housing incloses a flared opening 15 Fig. 6 which is formed in the tub 10 adjacent the bottom of the clothes receptacle 11. A guide 16 which is shown in perspective in Fig. 7 is adjustably secured in the lower housing 12 by means of a bolt 17 which passes through a slot 18 formed in the tongue 19 and is provided with arms 20 and 21 which extend through the flared opening and serve to guide the water into and out of the lower housing 12 when the inner receptacle is rotating. It will thus be seen that when the clothes receptacle is rotating, the water in the water receptacle 10 will circulate through the housing 12 thus keeping the water in the housing at the same temperature as the water within the tub.

The water glass 22 has its lower end extending through the packing gland 23 into an opening formed in the upper wall of the housing 12 and rests upon a grating 24 which extends across the opening through which the glass 22 passes. It will thus be seen that the grating 24 serves to support the glass 22 and also serves to prevent the float 25 from passing downwardly into the housing 12 when the water is removed from the tub 10. It will also be noted that when desired, the packing gland can be removed and a new glass easily inserted in case the water glass is broken.

The upper or outlet housing 26 is secured to the tub 10 by means of screws 27 which pass through the ears 28. This outlet housing 26 is provided with an opening through which the water glass 22 extends, a packing 29 being provided to prevent leakage at the top of the water glass. From an inspection of Fig. 10 it will be seen that the outlet housing 26 incloses an opening 30 formed in the tub 10 and that a grating 31 is provided to prevent the float from passing through the opening 30 in case the water in the tub reaches a sufficient height to permit the float to enter the housing 26. A cap or closure 32 is hinged to the housing 26 and when held in a closed position by the catch 33 closes an opening 34 formed in the top of the housing. It will thus be seen that when it is desired to clean the water glass the cap or closure 32 can be opened and the cleaner 35 passed through the opening 34 and through the housing 26 into the water glass. When this cleaner 35 is not in use its eye 36 is placed upon the hook 37 and its lower end portion is passed between the fingers 38 extending from the lower housing 12. When the cleaner is in the position shown in Figs. 1 and 2 it will serve as a protecting rod for the water glass and prevent the glass from being accidentally struck and broken.

The thermometer 39 which is of the mercury type extends through a tubular casing 40, the lower end of which extends through the packing 41 into the inlet housing 12 and the upper end of which passes through a bracket 42 carried by the tub 10. A scale 43 is carried by the tubular casing 40 and is provided so that the height of the water in the tub can be easily gaged. The float 25 is provided so that the water line in the glass can be easily seen and thus the height of the water in the glass easily ascertained in case the gage and thermometer are not in a good light. A second scale 44 is carried by the tubular casing 40 between the bracket 42 and bracket 45 which is carried by the upper housing 26 and is provided with a slot 46 which registers with a slot formed in the tubular casing 40 so that the thermometer may be read and thus the temperature of the water easily ascertained.

It will thus be seen that with this device the height and temperature of the water in the tub can be easily ascertained and it will also be seen that if bluing or some other substance discolors the water glass, the glass can be easily cleaned by lifting the cap 32 and thrusting the cleaner 35 down into the glass. It will be further seen that the water in the tub will be guided into and out of the lower housing by the arms 20 and 21 thus keeping the water in the housing at the same temperature as the water in the tub and causing the thermometer to accurately indicate the temperature of the water in the tub.

What is claimed is:—

1. In a washer an outer receptacle provided with upper and lower openings, a lower inlet housing carried by said outer receptacle and inclosing the lower opening formed therein, a guide adjustably mounted in said inlet housing and provided with arms extending through the lower opening of said receptacle and having their free ends extending in diverging relation, an upper housing inclosing the upper opening formed in said receptacle, a water glass positioned between said upper and lower housings and having its upper and lower ends extending into said housing, and a thermometer extending into said lower housing.

2. In a washing machine a water receptacle provided with upper and lower openings, a lower housing inclosing the lower opening of said receptacle, a guide adjustably mounted in said lower housing and extending through the lower opening of said receptacle, an upper housing inclosing the upper opening of said receptacle, a water glass extending between said upper and lower housings and communicating with the same, and a thermometer extending into said lower housing.

3. A device of the character described comprising a lower inlet housing having an inlet, a guide mounted within said housing and provided with flaring arms extending through the inlet opening of the same, an upper housing, a water glass communicating with said housings, and a thermometer extending into said lower housing.

4. A device of the character described comprising upper and lower housings, a water glass communicating with said housings, a thermometric element extending into said lower housing, and means adjustably mounted in said lower housing for guiding water into and out of said lower housing.

In testimony whereof I affix my signature in presence of two witnesses.

JAMES A. LEWIS.

Witnesses:
JAMES J. LYNCH,
JAMES J. GALLAGHER.